(12) United States Patent
Ozer et al.

(10) Patent No.: US 7,947,750 B2
(45) Date of Patent: May 24, 2011

(54) METHOD FOR REMOVING COLOR FROM POLYMERIC MATERIAL

(75) Inventors: Ronnie Ozer, Arden, DE (US); Kevin R. Gerzevske, Wilmington, DE (US)

(73) Assignee: BASF SE, Ludwigshafen (DE)

( * ) Notice: Subject to any disclaimer, the term of this patent is extended or adjusted under 35 U.S.C. 154(b) by 299 days.

(21) Appl. No.: 12/080,977

(22) Filed: Apr. 8, 2008

(65) Prior Publication Data

US 2008/0255259 A1    Oct. 16, 2008

Related U.S. Application Data

(60) Provisional application No. 60/922,854, filed on Apr. 11, 2007.

(51) Int. Cl.
*C08J 11/04* (2006.01)

(52) U.S. Cl. ............. 521/49.5; 521/48.5; 8/102; 8/107; 8/115.51; 8/116.1; 8/194; 8/196; 528/480; 528/495; 510/407; 510/409

(58) Field of Classification Search ............ 521/40, 521/40.5, 48, 48.5, 49, 49.5; 528/310, 353, 528/332, 333, 334, 335, 480, 491, 492, 495; 510/381, 384, 405, 409, 419, 480, 490, 499, 510/504, 407; 8/492, 101, 102, 107, 115.51, 188, 194, 196, 115.56, 115.65, 116.1, 181, 137, 141

See application file for complete search history.

(56) References Cited

U.S. PATENT DOCUMENTS

| | | | |
|---|---|---|---|
| 3,591,325 A | 7/1971 | Sapers | 8/102 |
| 4,227,881 A | 10/1980 | Fono | 8/102 |
| 4,783,193 A | 11/1988 | Pensa | 8/102 |
| 5,989,296 A | 11/1999 | Patton et al. | 8/440 |
| 6,083,283 A | 7/2000 | Berkstresser, IV et al. | 8/102 |
| 2006/0009369 A1* | 1/2006 | Kilkenny et al. | 510/504 |
| 2006/0070188 A1 | 4/2006 | Mauldin et al. | 8/102 |
| 2007/0231283 A1* | 10/2007 | Javet et al. | 424/62 |

* cited by examiner

*Primary Examiner* — James Seidleck
*Assistant Examiner* — Frances Tischler
(74) *Attorney, Agent, or Firm* — Joseph Suhadolnik; Tyler A. Stevenson

(57) ABSTRACT

Color is removed from polymeric material by a method which comprises contacting a dyed or pigmented polymer composition with a non-aqueous extraction solvent comprising a nitrogen containing organic base, an ammonium salt and an alkanol. The present method is readily applied to a process for recycling colored polyamide substrates such as dyed nylon fiber.

21 Claims, No Drawings

METHOD FOR REMOVING COLOR FROM POLYMERIC MATERIAL

This application claims benefit under 35 USC 119(e) of U.S. provisional application No. 60/922,854, filed Apr. 11, 2007.

This invention provides a method for removing color from polymeric material, for example, a method for extracting colorants from dyed polyamide compositions, by contacting a colored polymer composition, for example a dyed or pigmented polymer, with a non-aqueous extraction solvent comprising a nitrogen containing organic base, an ammonium salt and an alkanol. The present method is readily applied to a process for recycling colored polyamide substrates such as dyed nylon fiber.

BACKGROUND OF THE INVENTION

As the amount of available landfill space decreases, and the number of articles manufactured from synthetic polymers increases, there is a need for environmentally responsible methods for disposal of these polymer containing articles. A welcome alternative to landfill disposal is the recycling and reuse of the polymers.

One significant limitation to the use of recycled synthetic polymer material is the imparted color. Colorants such as pigments and dyes are commonly added to polymer compositions for practical and aesthetic reasons and there is often a significant color difference between virgin polymer and a surface dyed fiber or otherwise colored polymer as it exists in a potentially recyclable polymeric article. The presence of a colorant may also impair the processability of the polymer during conventional recycling processes.

For example, a dye on the surface of recycled polymeric fibers may render the polymer unsuitable for reuse if the dye, should it survive processing without itself degrading or causing the polymer to degrade, is not consistent with the color desired for the article produced from the recycled polymer. In a worst case scenario, an article otherwise suitable for recycling would be rejected completely and deposited in a landfill simply because its color is undesirable or inappropriate for a particular downstream use.

A process for removing colorants from polymeric articles is therefore desirable. While a single process will in all likelihood not be applicable to all polymers, significant quantities of potentially recyclable polymer can be culled from single commercial sources. For example, a substantial quantity of polyamide fiber from post consumer carpet is potentially available for recycle. Approximately 40% of the face fibers in post residential carpet waste in the United States is surface dyed Nylon 6, while another 40% is surface dyed Nylon 6,6.

U.S. Pat. No. 4,227,881, incorporated herein in its entirety by reference, discloses a process for stripping dyes from textile fabrics which involves heating an aqueous solution of an ammonium salt, a sulfite salt and an organic sulfonate to at least 60° C. and adding the dyed fabric to the heated solution while maintaining the temperature of the solution.

U.S. Pat. No. 5,989,296, incorporated herein in its entirety by reference, discloses a process for removing indigo dye from denim scrap by extracting the fabric with an organic solvent in which the indigo dye is soluble at elevated temperatures, such as 1,1,2-trichloroethane. The solvent is then cooled and extracted with an aqueous solution containing a reducing agent.

U.S. Pat. No. 4,783,193, incorporated herein in its entirety by reference, discloses a process for stripping color from synthetic polymer products by contacting the colored polymer with dispersions of alkyl halides and aqueous solutions of bleaching/oxidizing agents to which specified quantities of acids and surfactant/wetting agents are added. Among the drawbacks are the use of potentially hazardous halogens and organic halides and the special provisions required to prevent escape of vapors which could cause environmental harm.

In general, processes which use harsh stripping agents damage or destroy the colorant and generate a chemical waste stream that must be treated or disposed. Such harsh methods can also generate irremovable colorant fragments or harm the polymer which may limit the downstream recycle ability of the color-stripped material.

Processes which involve the simple solvent extraction of a dye from a polymeric substrate are conceptually simple, and are known to be viable at least on an analytical scale to determine dyes which may be present in, for example, a polymeric fiber composition. However, a useful industrial scale process for removing a colorant from a recyclable polymer must remove most if not all of the colorant from the polymer, and as noted before, it is expected that a single process or single extraction system will not be sufficient for the efficient removal of all colorants from all polymeric substrates.

U.S. Pat. No. 6,083,283, incorporated herein in its entirety by reference, discloses a process for removing color and extracting dyes from acrylics and polyamides by contacting them with a swelling agent under conditions such that the swelling agent interrupts the molecular forces within the polymer matrix and opens the polymer structure sufficiently to remove natural and synthetic colorants dispersed throughout a polymeric article.

Published US Pat. Appl. 20060070188, incorporated herein in its entirety by reference, discloses a process for dye removal from the surface of fibers by contacting the fibers with a non-aqueous ester stripping composition preferably containing at least one cyclic ester and optionally containing a surfactant, an alcohol, or both. This process claims the advantage of not having swelling agents penetrate throughout the polymer matrix which swelling agents would then have to be removed.

There remains a need for a process which can be relied upon to efficiently and completely remove colorants, that is dyes and pigments, from polymeric substrates and commercial products comprising these polymeric substrates to allow for the ready recycling of the polymers contained therein. The present invention provides a practical, cost-effective and environmentally friendly process for removing colorants from these polymeric substrates, such as polyamide articles, for example, dyed nylon fiber, making the polymer ready for recycling and reuse.

SUMMARY OF THE INVENTION

The present invention provides a process for removing colorants from colored polymer compositions, such as polyamide compositions. The process comprises contacting the colored polymer, for example a dyed polyamide composition, with a non-aqueous extraction solvent comprising a nitrogen containing organic base, an ammonium salt and an alkanol to produce a decolorized polymer which is then separated from the extraction solvent and colorant. The process of the present invention is useful for quickly and thoroughly removing dyes from polymers, for example, polyamides such as Nylon 6 or Nylon 6,6, as part of a recycling process without substantially degrading the polymer, thus allowing for the polymer recovery and reuse. Other polymers frequently encountered in dyed fibers, such as polyesters and polypropylenes, are also decolorized by the present process.

While dyes, for example acid dyes, are conveniently removed by the present process, certain pigments may also be removed under these conditions.

DETAILED DESCRIPTION OF THE INVENTION

While in this disclosure the invention is predominately described in detail for polyamide compositions, the present process or obvious variants thereof can be employed to remove colorants from other colored polymer compositions, such as dyed polypropylene and polyester fibers, for example, dyed PET fibers.

The colored polymer composition, for example, dyed polyamide composition, is typically a solid and remains predominately if not exclusively a solid throughout the process. That is, it is expected that in any process wherein a solvent contacts a solid, some dissolution may occur or small equilibrium amount of dissolved solid may be present and such an occurrence is possible here, however such dissolution of the polymer is minimal in the present process. The decolorized polymer, for example, polyamide, is then readily separated from the extraction solvent by, for example, filtration or by decanting the solvent, and the recovered polymer is optionally washed with water, an organic solvent or a mixture of water and an organic solvent.

The non-aqueous extraction solvent comprises a nitrogen containing organic base, an ammonium salt and an alkanol.

The concept of a nitrogen containing organic base is widely understood by the practicing chemist and is described in numerous textbooks. The nitrogen containing organic base of the extraction solvent can be a strong base or a weak base and typically comprises an amine or amide which are well known items of commerce. By amide, it is meant a carboxamide, e.g., the condensation product between a carboxylic acid and ammonia or organic amine. More than one organic base may be present, but frequently excellent results can be achieved using a single amine or amide as the organic base. The organic base in many cases will make up a significant part, e.g., 50% or more, of the extraction solvent, and is typically a liquid at the temperatures encountered throughout the process.

For purposes of this disclosure, the phrase "organic base" refers to the nitrogen containing organic base of the extraction solvent.

A number of amines are widely available and may be used as an organic base in the present invention including mono-, di- and tri-alkyl amines. The amines may be acyclic cyclic or polycyclic amines. Aryl and aromatic amines such as pyridines and anilines can be used but may be less practical choices given the toxicology of many pyridines and anilines. Polyamines are also known and may be used.

For example, known amines which may be used in the invention include mono-, di-, or tri-$C_1$-$C_{12}$ alkyl amines wherein the alkyl groups may be unsubstituted or substituted by commonly occurring groups such as hydroxy, alkoxy and aryl, which alkyl groups of the di and tri alkyl amines may be the same or different;

secondary or tertiary cyclic amines, for example, 5-7 membered heterocycles containing at least one carbon atom and at least one nitrogen atom, which heterocycle may also contain other heteroatoms selected from O, S and additional nitrogen atoms, wherein the ring nitrogen or nitrogens may be unsubstituted or substituted by $C_{1-12}$ alkyl groups which alkyl groups may be unsubstituted or substituted by commonly occurring groups such as amino, hydroxy, alkoxy or aryl, and wherein the carbon atoms of the ring may be further substituted with common groups such as amino, oxo, hydroxy, alkoxy, aryl or $C_{1-12}$ alkyl which alkyl may be unsubstituted or substituted by commonly occurring groups such as amino, oxo, hydroxy, alkoxy or aryl, or any two of the substituents on the ring carbon or nitrogen atoms may be connected to form an additional carbocyclic or heterocyclic ring thus providing a polycyclic amine.

Cyclic and polycyclic amines include substituted or unsubstituted, saturated or unsaturated pyrrolidines, piperidines, morpholines, piperazines, pyrimidines, aza- and diaza-bicyclic octanes, nonanes, undecanes and the like.

Amides are also widely available and are useful as an organic base in the present invention. The amides of the invention are carboxamides such as those derived from carboxylic acids and ammonia or from carboxylic acids and monoalkyl, dialkyl or N—H cyclic amines as described above, or cyclic amides such as 2-pyrrolidones and 2-piperidones. The cyclic amides may also contain other heteroatoms in the ring and may also bear substituents as described above for cyclic amines.

For example, the amides useful as organic bases in the present invention are amides derived from unsubstituted or commonly substituted $C_{1-12}$ carboxylic acids and ammonia, commonly substituted or unsubstituted $C_{1-12}$ monoalkyl or dialkyl amines, or N—H cyclic amines as described above. "Commonly substituted" comprises substituents such as amino, oxo, hydroxy, alkoxy or aryl.

For example, the amides useful as organic bases in the present invention are amides derived from unsubstituted or commonly substituted $C_{1-12}$ carboxylic acids and ammonia or unsubstituted or hydroxy or alkoxy substituted $C_{1-12}$ monoalkyl or dialkyl amines.

For example, amides derived from formic, acetic, proprionic, butyric, dimethyl acetic and hexanoic acid and ammonia or unsubstituted $C_{1-4}$ monoalkyl or dialkyl amines.

In one embodiment, the nitrogen containing organic base comprises a cyclic amide such as a 2-pyrrolidone, 2-piperidone, 2-morpholinone or 2-pyranone.

For example, a cyclic amide or the formula

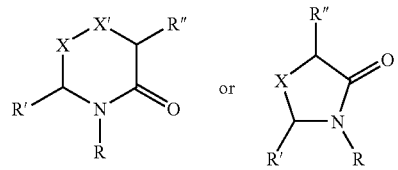

wherein
X and X' are independently from each other O, N—H, N—$C_{1-4}$ alkyl, C—H or $C_{1-4}$alkyl, and R, R' and R" are independently from each other hydrogen or $C_{1-4}$ alkyl.

For example, X and X' are independently from each other O, N—H, N—$CH_3$, C—H or C—$CH_3$ and R, R' and R" are independently from each other hydrogen or $CH_3$ alkyl.

For example X and X' are independently from each other O, N—H, N—$CH_3$ or C—H, R is $CH_3$ and R' and R" are hydrogen.

For example, amides useful as an organic base include formamide, N-methyl-formamide, N,N-dimethyl-formamide, acetoamide, N-methyl-acetoamide, N,N-dimethyl-acetoamide, 2-pyrolidone and N-methyl-pyrolidone; for example 2-pyrolidone and N-methyl-pyrolidone.

The ammonium salt comprised by the extraction solvent is any salt comprising an ammonium cation and a counter anion.

An ammonium cation is, for example, unsubstituted ammonium, ammonium substituted 1, 2, 3 or 4 times by one or more groups selected from $C_{1-24}$alkyl, $C_{2-24}$alkyl interrupted by one or more oxygen atoms, $C_{6-10}$-aryl, $C_{7-9}$ aralkyl, and said alkyl, interrupted alkyl, aryl and aralkyl substituted by alkyl, OH, $OC_{1-24}$alkyl or $OC_{1-24}$acyl.

The ammonium cation may also comprise a ring, such as a cyclohexyl or pyridine ring, or polycycle, which ring or polycycle may be substituted.

For example, the ammonium cation is mono-, di-, tri- or tetra-$C_{1-24}$alkylammonium wherein each alkyl group can be the same or different; mono-, di-, tri- or tetra-benzyl ammonium; mono-, di-, tri- or tetra-$C_{1-24}$hydroxyalkylammonium wherein each alkyl group can be the same or different.

For example, the ammonium cation is an unsubstituted ammonium or a mono-, di-, tri- or tetra-substituted ammonium wherein each of the substituents in independently chosen from the group of $C_{1-24}$alkyl, benzyl, $C_{6-10}$aryl, and $C_{1-24}$hydroxyalkyl.

Common counterions of ammonium salts include hydroxide, alkoxide, conjugate bases of organic acids, common examples being formate, acetate, proprionate, benzoate and tosylate, and conjugate bases of inorganic acids, common examples being fluoride, chloride, bromide, iodide and sulfate.

The extraction solvent also comprises an alkanol, e.g., a $C_{1-24}$ alcohol, diol or polyol. Oligomers and polymers containing one or more hydroxyl groups, such as polyalkylene glycols can also be used. Common alcohols such as methanol, ethanol, propanol, iso propanol, any of the isomers of butanol, pentanol, hexanol and octanol including 2-ethylhexanol can be used with good results.

Typically, the alkanol will not be the majority component of the extraction solvent and will generally be present in less than 50% of the reaction mixture, for example, from about 0.5% to about 40%, for example from about 1% to about 25% by weight based on the total weight of the extraction solvent.

Alkyl is a straight or branched alkyl chain of the specified number of carbon atoms and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl and the like.

The invention uses a "non-aqueous extraction solvent" and the presence of significant amounts of water during the period of time wherein the extraction solvent is in contact with the colored polymer is not encouraged.

However, the amides, amines, ammonium salts and alkanols of the extraction solvent are frequently difficult to obtain or store in an anhydrous state and some water is bound to be present. Economic considerations may make it more feasible to use an amide, amine, ammonium salt or alkanol which is mixture that contains water. Furthermore, the colored polymer which is to be decolorized may have been washed prior to being contacted by the extraction solvent and it may be inconvenient to dry the polymer before decolorization. The extraction solvent may therefore have present therein measurable amounts of water, that is from about 0.1% or less to about 25% water, for example from about 0.1% to about 20% or less water by weight based on the total weight of the extraction solvent. In general, the extraction solvent contains between about 0.1% or less to about 10% water by weight based on the total weight of the extraction solvent.

In a particular embodiment of the invention the extraction solvent is essentially water free, meaning that the extraction solvent contains less than 5% water by weight based on the total weight of the extraction solvent, for example, from about 0.1 to about 2% water.

The extraction solvent therefore typically comprises from about 40 to about 98% organic base, from about 0.1 to about 20% ammonium salt and from about 0.1 to about 40% alkanol, for example, from about 50% to about 98% organic base, from about 1 to about 15% ammonium salt and from about 1 to about 35% alkanol by weight based on the total weight of the extraction solvent. Often the extraction solvent is greater than 50% by weight based on the total weight of the extraction solvent, for example, the extraction solvent is from about 75% to about 98% organic base, from about 1 to about 10%, for example 1-5%, ammonium salt and from about 1 to about 25%, for example 1-20%, alkanol by weight based on the total weight of the extraction solvent.

It should be appreciated by one of ordinary skill in the art that the exact composition of the extraction solvent will vary depending on the polymer, for example, the specific polyamide being decolorized and the colorants being removed. The exact amount of extraction solvent relative to the amount of polymer to be decolorized, the time the extraction solvent is in contact with the colored polymer and the temperature used will likewise vary on the polymer and the type of colorants, but may also vary depending on the amount of colorants present in the polymer. One might expect that more solvent, longer contact times or more than one extraction period would be necessary for hard to remove colorants or heavily dyed or pigmented polyamide. However, such optimization of exact amounts and conditions should be apparent given the present disclosure, and as such are considered to be within the scope of the present invention.

It is possible that in certain instances, for example, certain slightly dyed polyamide, may be decolorized using a small amount of extraction solvent relative to the amount of polyamide. It is conceivable that less extraction solvent by weight relative to the polyamide may be used. However, in general, the weight ratio of extraction solvent to colored polymer will be at least 1:1 and can be as high as 1000:1. Economic and environmental considerations dictate that the lowest effective amount of solvent be used and the weight ratio of extraction solvent to colored polymer will in general be from about 1:1 to about 100:1, for example, from about 2:1 to about 50:1.

One factor impacting the amount of extraction solvent needed is the surface area of the colored polymer composition. Color removal occurs most readily when the entire article is wetted by the solvent and is most efficient from small particles or very thin articles such as fiber. Fibers, for example, have a very high surface area which will obviously require a larger volume of solvent to wet than would a pellet of the same weight. The shape of any vessel in which the present process is carried out will also impact the amount of solvent used and the time required for decolorization.

The colored polymer can be any commercial polymer which has been dyed, pigmented and/or stained. While dyes are expected to be more readily removed, other color agents such as certain pigments may also either dissolve in the extraction solvent or otherwise discharge from the polyamide during the decolorization process.

The polymer may be in almost any solid shape or article, for example a molded article or a fiber. Extraction is a process that works more efficiently on a solid article that has a large surface area. The polymer being decolorized may therefore be chopped, ground, sheared or otherwise processed into a smaller or thinner article or particle.

One embodiment of the present invention is the decolorization of a colored polyamide, for example a Nylon, for example Nylon 6 or Nylon 6,6. A particular embodiment relates to the decolorization of colored nylon fiber, for example dyed nylon fiber. A significant source of dyed nylon fiber, as mentioned above, is carpeting, which fiber is frequently surface dyed. The method herein is ideally suited for decolorizing such nylon fiber prior to recycling.

If the colored polymeric material to be treated is post consumer carpet containing, for example, colored nylon fibers, the process optionally also comprises one or more of the preliminary steps of (1) physically separating carpet having nylon face fibers from carpet having non-nylon face fibers; (2) prepurifying the carpet having nylon face fibers from step (1) by mechanically separating dirt and other loosely-attached foreign materials and washing the carpet with detergent and water; (3) separating the nylon face fibers from the backing of the carpet by a method selected from the group consisting of shearing, cutting with a hot wire, cutting with a laser, and combinations thereof; and (4) grinding, cutting, or shearing the colored nylon fibers into particles having reduced size.

For example, one embodiment of the present invention is a process for recycling colored polyamide fibers comprising the steps of shearing or cutting Nylon 6 or Nylon 6,6 face fibers from post consumer carpet waste, then contacting the colored polyamide fibers with the extraction solvent of the present invention. In another embodiment, a process for recycling colored polyamide fibers comprises the steps of shredding the entire carpet and grinding the face fibers and backing components to yield individual fibers commingled with discrete particles of backing materials, then separating the fibers from the non-fibrous components before contacting the colored polyamide fibers with the extraction solvent of the present invention.

Similar methods are employed for the recycling of other polymeric fibers such as dyed polypropylene and polyester fibers.

Again, it should be appreciated by one of ordinary skill in the art that the contact time wherein the extraction solvent is in contact with the colored polymer, the processing temperatures and the pressure will vary greatly depending on the variables described herein. However, such optimization of exact amounts and conditions should be apparent given the present disclosure, and as such are considered to be within skill of the average practitioner.

The process can be carried out at almost any desired temperature or pressure provided that the temperature is not so low that the extraction solvent solidifies or so high that the polymer dissolves in the extraction solvent or is significantly degraded in some way. For example, temperatures as low as 10° C., even 0° C., may be encountered or as high as 220° C. or higher. Higher temperatures would most likely speed the process, but depending on the composition of the extraction solvent, may require increased pressure.

While the optimal conditions for removing the colorants will vary depending on the specific polymer, size and shape of the polymeric particles being extracted, the colorants being removed etc, one advantage of the present process is that it can be readily carried out at ambient temperatures, i.e., temperatures more commonly called room temperatures, for example from about 15° C. to about 30° C. Of course, higher temperatures may be required, for example, the extraction solvent may be predominately a weak organic base like hexanoamide which has a melting point of about 100° C. and some heat may be necessary to keep the extraction solvent fluid.

In general, the temperatures encountered in the present process are from about 0° C. to about 220° C., for example, from about 10° C. to about 160° C., for example, from about 15° C. to about 125° C., for example, from about 15° C. to about 60° C.

The contacting step is preferably performed at ambient or greater pressure. Applied pressure may be that provided by an inert gas, such as nitrogen or argon, or it may be the pressure generated by the vaporization of the liquids in the contacting composition.

In one embodiment, the contacting step is carried out at a pressure of about 1 atmosphere to about 2 atmospheres, for example, a pressure of about 1.0 atmosphere to about 1.5 atmospheres. In another embodiment the pressure above roughly 1 atmosphere is that which is generated by the vaporization of heating the contacting composition in a sealed container.

The extraction solvent will be in contact with the colored polymer for an amount of time suitable to affect the desired decrease in color of the polymer at the chosen temperature. For example, the contact time can be an amount of time sufficient for effecting a particular delta E of the polymer, for example the time sufficient to lower initial color values of a dyed or pigmented polyamide, e.g., CIE Lab color values, by 50%, 60%, 70%, 80%, 90% or more, or for example, the time sufficient to effect a Delta E of 50 or 60 or more. It is understood that polymers that are less intensely colored are considered decolorized after obtaining a lower value for Delta E as there is less color originally.

The contact time may be the amount of time of a single contact between the extraction solvent and the colored polymer, or it may be the sum of repeated contacts. For example a total contact time of 3 hours could be one three hour period or three one hour periods.

The time required for color removal can be almost any amount of time from a minute to three days, but in general will be from about 5 minutes to about 24 hours, for example, from about 30 minutes to about 6 hours.

"Colorant" is defined as any dye, pigment or colored composition or combinations thereof that may intentionally or accidentally color or stain polymeric materials;

"dye" is defined as an organic material which imparts color to a polymer and which is soluble in the polymer into which it is incorporated.

"pigment" is defined as an organic material which imparts color to a polymer and which is insoluble in the polymer into which it is incorporated.

A colorant may therefore be an insoluble pigment in a polymer, but may be soluble in the extraction solvent.

Any dye with solubility in the extraction solvent, or pigment which can be solubilized by the reaction solvent, can be removed from the polymer by the present process. For example, acid dyes are readily removed.

Other colorants or materials not soluble in the extraction solvent to any appreciable extent may also be removed from the polymer under the conditions of the present process. For example, as discussed in the art previously cited, the solvent may swell the polymer allowing for the removal of particles such as pigments like carbon black or metal oxides. Methods whereby conditions are chosen which allow for the recovery of the colorants for reuse are not excluded from the invention.

In a common embodiment of the present invention, the polymer to be decolorized is colored by a mixture of colorants, for example a mixture of dyes.

The extraction solvent, or the optional wash solvents, may also contain, for example surfactants and other useful adjuvants known in the art, however, the concentration of such optional adjuvants in the extraction solvent is preferably less than 5%, for example less than 2%.

Typically, the extraction solvent will consist essentially of the nitrogen containing organic base, ammonium salt and alkanol, optionally small amounts of water as discussed previously and the less than 5% of surfactants and other useful adjuvants. That is other components may be present, but only in quantities that do not substantively alter the nature of the extraction solvent. For example, other organic solvents, such as organic halides and cyclic esters, are not needed and in one particular embodiment of the present invention, organic halides and cyclic esters are excluded from the extraction solvent. In another embodiment, the extraction solvent consists of the nitrogen containing organic base, ammonium salt and alkanol, optionally small amounts of water, less than 5%, for example less than 2% of surfactants and other useful adjuvants and less than 10%, for example less than 5%, for example less than 2% other organic solvents.

The contacting step may be performed using a variety of techniques that will be apparent to one of ordinary skill in the art. Such techniques include immersing the colored polymer in the extraction solvent, applying an effective amount of the extraction solvent onto the colored polymer, coating an effective amount of extraction solvent onto the colored polymer, spraying an effective amount of extraction solvent onto the colored polymer and other similar such techniques.

Further the contacting step may be carried out in lots in a batch-wise manner or it may be carried out in a continuous manner. Agitation or stirring or other physical manipulation of the extraction solvent/polymer mixture may be employed.

The process and composition of the present invention are particularly useful in the recycling of thermoplastic materials including polyamide, polyester or polypropylene compositions. The polymers, for example, polyamides, treated according to the present invention may be reused in the same or different applications without exhibiting color pollution, degradation or other detrimental effect from the treatment. Treated polymer may be used in place of or blended with virgin polymer in any known thermoplastics applications including extruding the melted material to form fiber which may be dyed.

The present invention permits the extraction of dyes and other colorants from polymers such as polyamides without the need for harsh stripping agents. Stripping agents are defined herein as materials which oxidize, reduce or otherwise destroy the dye chromophore. As noted above, because of the highly reactive chemical nature of such stripping agents, their use can limit or prevent the recycling and reuse of the resulting decolored polymeric material. The contacting step in the process of the present invention is preferably conducted in the absence of such stripping agents. Thus the resulting polymeric material can fully replace or be blended with virgin polymer for use in articles that conventionally decolorized polymeric material cannot presently be used.

EXAMPLES

All percentages of the present disclosure are by weight unless otherwise specified. CIE L*a*b coordinates are obtained by common methods using a Macbeth 2020 Integrating Sphere Spectrophotometer. When the degree of decolorization is qualitatively rated by visual observation as excellent, good, fair, poor or bad, a grade of fair indicates an amount of color removal acceptable for re-use of the material in some cases, a grade of good or excellent indicates an amount of color removal desirable for re-use of the material in most cases. For vividly or darkly colored samples, the following approximate correlation with Delta E (DE) can be assumed: bad~DE <40; poor~DE 41-54; fair~DE 55-57; good~DE 58-60; excellent~DE >60.

Example 1

Shredded, light brown Nylon carpet fiber from a carpet mill is placed in a beaker containing a solution of 2.5% tetramethylammonium hydroxide, 7.5% methanol, and 90% n-methylpyrrolidone. After standing 72 hours at room temperature the mixture is filtered to collect the fiber which is washed with methanol and blown dry with air. Excellent results are achieved, the resulting fiber is near white.

For comparison, the above procedure is repeated without the presence of tetramethylammonium hydroxide with poor to fair results. The resulting fiber retains more of the starting light brown color than the sample extracted using the solvent containing the tetramethylammonium hydroxide.

Example 2

An extraction solvent containing 2.5% Tetramethylammonium hydroxide, 7.5% methanol, and 90% n-methylpyrrolidone is prepared. Brightly colored samples of dyed, Nylon 6 carpet fiber are obtained from a commercial carpet mill and the CIE L*a*b coordinates are measured.

Approximately 2 gram samples of orange fibers, red fibers and blue fibers are separately chopped with scissors and each sample is added to approximately 100 mL of the extraction solvent in a flask equipped with a condenser. The resulting mixtures are stirred and heated at 120° C. for 5 hours and filtered to collect the fiber which is washed with methanol and blown dry with air. The resulting fiber from each sample is near white.

The CIE L*a*b coordinates of the decolorized fiber are measured and compared to the starting data in the table below.

| Sample Description | L* | a* | b* | DL* | DC* | DH* | DE* |
|---|---|---|---|---|---|---|---|
| nylon-6-blue initial | 26.2 | 5.2 | −38.4 | | | | |
| nylon-6-blue final | 84.7 | 0.6 | 8.0 | 58.6 | −30.7 | 35.1 | 74.8 |
| nylon-6-orange initial | 54.3 | 45.3 | 64.9 | | | | |
| nylon-6-orange final | 83.2 | 0.8 | 20.1 | 28.9 | −59.0 | 22.5 | 69.4 |
| nylon-6-red initial | 30.5 | 47.0 | 15.2 | | | | |
| nylon-6-red final | 87.8 | 2.8 | 9.1 | 57.3 | −39.9 | 19.9 | 72.6 |

Example 3

The procedure of Example 2 is repeated but the colored fiber/extraction solvent mixture is stirred at 60° C. for 5 hours with nearly identical, excellent results.

Example 4

The procedure of Example 2 is repeated but the colored fiber/extraction solvent mixture is stirred at 120° C. for 2 hours with excellent results.

Example 5

The procedure of Example 2 is repeated but the colored fiber/extraction solvent mixture is stirred at 60° C. for 2 hours with good to excellent results.

Example 6

The fiber samples and extraction solvent of Example 2 are used. Approximately 2 gram samples of the chopped orange, red and blue fibers are separately added to approximately 100 mL of the extraction solvent in a flask equipped with a condenser. The resulting mixtures are stirred and heated at 60° C. for 1 hour after which the fibers are collected and washed as above. The fibers are then added to 100 mL of fresh extraction solvent and stirred at 60° C. for another hour after which the fibers are collected, washed and dried as above with good to excellent results.

Example 7

Approximately 2 gram samples are cut from a section of commercial carpet constructed with dyed nylon 6,6 and the fibers are chopped with scissors. The samples are treated according to the procedure of Example 2 with excellent results.

Example 8

The procedure of Example 3 is repeated using an extraction solvent containing 2.5% ammonium acetate, 7.5% methanol, and 90% n-methylpyrrolidone with excellent results.

Example 9

The procedure of Example 3 is repeated using an extraction solvent containing 3.5% ammonium benzoate, 11.5% ethanol, and 85% n-methylpyrrolidone with excellent results.

Example 10

The procedure of Example 3 is repeated using an extraction solvent containing 2.5% tetrabutylammonium ammonium chloride, 7.5% methanol, and 90% n-methylpyrrolidone with excellent results.

Example 11

The procedure of Example 3 is repeated using an extraction solvent containing 2.5% tetrabutylammonium ammonium hydroxide, 7.5% butanol, and 90% n-methylpyrrolidone with excellent results.

Example 12

The procedure of Example 3 is repeated using an extraction solvent containing 2.5% tetrabutylammonium ammonium hydroxide, 7.5% butanol, and 90% pyrrolidone with excellent results.

Example 13

The procedure of Example 4 is repeated using an extraction solvent containing 2.5% tetramethylammonium ammonium hydroxide, 7.5% methanol, and 90% dimethyl acetamide with good to excellent results.

Example 14

The procedure of Example 3 is repeated using an extraction solvent containing 2.5% tetramethylammonium ammonium hydroxide, 7.5% methanol, and 90% pyrrole with fair to good results.

Example 15

The procedure of Example 3 is repeated using an extraction solvent containing 2.5% 1-methylpiperizine dihydrochloride, 7.5% methanol, and 90% n-methylpyrrolidone with excellent results.

The invention claimed is:

1. A process for removing a colorant from a colored polymer composition which process comprises immersing the colored polymer composition into a non-aqueous extraction solvent for a time sufficient to lower the initial CIE Lab color values of the colored polymer composition by 50% or more,
wherein the non-aqueous extraction solvent is essentially water free, containing less than 5% water by weight based on the total weight of the extraction solvent, and comprises from about 40 to about 98% by weight based on the total weight of the extraction solvent of amine or amide organic base, from about 0.1 to about 20% by weight based on the total weight of the extraction solvent of ammonium salt and from about 0.1 to about 40% by weight based on the total weight of the extraction solvent of $C_{1-24}$ alcohol, diol or polyol, to produce a decolorized polymer which is then separated from the extraction solvent and colorant.

2. A process according to claim 1 wherein the ammonium salt is a tetra-alkyl ammonium salt.

3. A process according to claim 1, wherein the non-aqueous extraction solvent consists essentially of from about 50 to about 98% amine or amide organic base, from about 1 to about 15% ammonium salt and from about 1 to about 35% of a $C_{1-24}$ alcohol, diol or polyol.

4. A process according to claim 3, wherein the non-aqueous extraction solvent consists essentially of from about 75 to about 98% amine or amide organic base, from about 1 to about 10% ammonium salt and from about 1 to about 20% $C_{1-24}$ alcohol, diol or polyol.

5. A process according to claim 1 wherein the amine or amide organic base is an amide selected from the group consisting of formamide, N-methyl-formamide, N,N-dimethyl-formamide, acetoamide, N-methyl-acetoamide, N,N-dimethyl-acetoamide, 2-pyrolidone and N-methyl-pyrolidone.

6. A process according to claim 1 wherein the amine or amide organic base comprises a cyclic or polycyclic amine or a cyclic or polycyclic amide.

7. A process according to claim 1, wherein the colored polymer composition comprises a polyamide.

8. A process according to claim 7 wherein the colored polymer composition is a solid comprising a dyed polyamide, and the decolorized polyamide is separated from the extraction solvent by filtration and optionally washed with water, an organic solvent or a mixture of water and an organic solvent.

9. A process according to claim 7 wherein the amine or amide organic base is an amide selected from the group consisting of formamide, N-methyl-formamide, N,N-dimethyl-formamide, acetoamide, N-methyl-acetoamide, N,N-dimethyl-acetoamide, 2-pyrolidone and N-methyl-pyrolidone; for example 2-pyrolidone and N-methyl-pyrolidone.

10. A process according to claim 7 wherein the amine or amide organic base comprises a cyclic or polycyclic amide.

11. A process according to claim 10 wherein the amine or amide organic base is 2-pyrolidone or N-methyl-pyrolidone.

12. A process according to claim 7, wherein the colored polymer composition is a dyed Nylon 6 or Nylon 6,6 composition.

13. A process according to claim 12 wherein the colored polymer composition is a dyed Nylon 6 or Nylon 6,6 fiber.

14. A process according to claim 7 wherein the colored polymer composition is ground, shredded, cut, chopped or otherwise processed to form smaller particles prior to contacting the extraction solvent.

15. A process for recycling polyamide which comprises a process according to claim 7.

16. A process according to claim 1 wherein the weight ratio of extraction solvent to colored polymer is from about 1:1 to about 100:1.

17. A process according to claim 1 wherein the amine or amide organic base is 2-pyrrolidone or N-methyl pyrrolidone.

18. A process according to claim 1 for removing a colorant from a colored polymer composition which process comprises immersing in the absence of stripping agents, organic halides and cyclic esters, the colored polymer composition into a non-aqueous extraction solvent, for a time sufficient to lower the initial CIE Lab color values of the colored polymer composition by 50% or more wherein the non-aqueous extraction solvent consists of from about 40 to about 98% amine or amide organic base, from about 0.1 to about 20% ammonium salt, from about 0.1 to about 40% $C_{1-24}$ alcohol, diol or polyol, less than 5% water, less than 10% other organic solvents and less than 5% surfactants and adjuvants to produce a decolorized polymer which is then separated from the extraction solvent and colorant.

19. A process according to claim 18 wherein the non-aqueous extraction solvent consists of from about 50 to about 98% amine or amide organic base, from about 1 to about 15% ammonium salt, from about 1 to about 35% $C_{1-24}$ alcohol, diol or polyol, less than 2% water, less than 5% other organic solvents and less than 2% surfactants and adjuvants.

20. A process according to claim 18 wherein the colored polymer composition composition comprises a polyamide.

21. A process according to claim 1 for removing a colorant from a colored polymer composition which process comprises immersing the colored polymer composition into a non-aqueous extraction solvent for a time sufficient to lower the initial CIE Lab color values of the colored polymer composition by 90% or more.

* * * * *